United States Patent [19]

Green

[11] 4,025,397

[45] May 24, 1977

[54] METHOD AND SYSTEM FOR FRACTIONATION CONTROL RESPONSIVE TO HEAT BALANCE

[75] Inventor: Jarrell T. Green, Mount Prospect, Ill.

[73] Assignee: UOP Inc., Des Plaines, Ill.

[22] Filed: Nov. 28, 1975

[21] Appl. No.: 636,181

[52] U.S. Cl. .............................. 203/2; 203/DIG. 18; 202/160

[51] Int. Cl.² .......................................... B01D 3/42

[58] Field of Search ................... 203/1, 2, DIG. 18; 202/160; 196/132

[56] References Cited

UNITED STATES PATENTS

| 2,580,651 | 1/1952 | Boyd | 203/2 |
| 2,684,326 | 7/1954 | Boyd | 203/2 |
| 3,272,722 | 9/1966 | Walker | 203/2 |
| 3,361,646 | 1/1968 | MacMullan | 203/DIG. 18 |
| 3,408,261 | 10/1968 | Johnson | 203/2 |
| 3,411,308 | 11/1968 | Bellinger | 203/DIG. 18 |

*Primary Examiner*—Hiram H. Bernstein
*Attorney, Agent, or Firm*—James R. Hoatson, Jr.; Robert W. Erickson; William H. Page, II

[57] ABSTRACT

Control of a fractionation column is maintained by obtaining two differential temperatures between pairs of selected temperature-sensing points along the height of the column. One pair of temperature sensors is vertically-spaced above the feed tray, while the second pair is below the feed tray. Signals representing the sensed and measured delta-T's are employed in conjunction with a signal representing the flow rate of the feed stream in regulating the quantity of reflux to the rectification zone and in maintaining the required reflux to feed ratio.

6 Claims, 3 Drawing Figures

METHOD AND SYSTEM FOR FRACTIONATION CONTROL RESPONSIVE TO HEAT BALANCE

APPLICABILITY OF INVENTION

My inventive concept, as herein more fully described, encompasses a system and method for improving the control of a fractionation column functioning to separate a mixed-component feed stream. The system is particularly applicable where the intended product stream is characterized as a substantially-pure component — e.g., the overhead recovery of benzene from a mixture of aromatic hydrocarbons. A fractionation column must be maintained in heat balance in order to obtain the specified product composition, whether a bottoms product, overhead product, side-cut product, or where both bottoms and overhead product compositions are specified. For example, in recovering benzene from a mixture thereof with toluene and the various xylenes, proper heat balance, in conjunction with composition- and feed rate-responsive controls will result in a substantially-pure overhead benzene stream and, simultaneously, minimal benzene in the liquid bottoms product.

In the present specification, as well as the appended claims, the use of the term "fractionation column" synonymously alludes to "rerun column," "distillation column," "stripping column," etc. In the usual separation-via-fractionation technique, a mixed, or multi-component feed stream is introduced intermediate the ends of column, often at about its mid-point. Fractionation columns are vertically-disposed cylindrical chambers having a plurality of spaced-apart trays, or decks which provide intimate mixing of countercurrently-flowing liquid and vapors within the column. Heat is supplied to the column through the use of a reboiler heater, or heat-exchanger, communicating with the lower reboiler section. The reboiler section contains an inventory of liquid material, generally maintained by way of a suitable liquid-level controller, and a portion thereof is withdrawn, partially vaporized and returned to the column generally at a point just below the lowermost tray, or deck. Reflux is supplied to the column by cooling and condensing an overhead vaporous stream and returning a portion thereof through a locus above the uppermost tray, or deck. These two streams, the reflux and reboiled bottoms liquid, constitute the two major factors in the heat balance of the column, the remainder being the feed stream entering and the product streams leaving the column. Although understood by those skilled in the art of separation by fractionation, the definition of several additional terms, as employed herein, is believed to be warranted. The "reboiler section" of a distillation column is that portion below the lowermost tray, or deck, while the "fractionation section" is that portion of the column above the lowermost tray. The "stripping section" includes those trays between the lowermost tray and the feed tray, while the "rectification section" refers to those trays above the feed tray.

Also, as utilized herein, the terms "heat-input" and "heat-input content" of a stream, allude to enthalpy and are intended to connote the quantity of energy, per unit of time, introduced into or removed from the column by a given stream, whether returned to column at a lower temperature (reflux), or at a higher temperature (reboiled liquid bottoms). For example, at a given composition and temperature, the feed stream will have a given enthalpy expressed as BTU/lb. Depending upon its flow rate, expressed as lbs./hr., it will supply a given heat-input to the column expressed as BTU/hr. Any change in temperature, flow rate, or composition will change the heat-input thereof. Likewise, a change in the flow rate of the reflux stream will affect its contribution to the heat balance. With respect to the reboiled liquid bottoms returned to the column, its enthalpy contribution may be varied via either its flow rate or the flow rate of the heat-exchange medium employed to partially vaporize it. Although many variables relevant to the feed stream, reflux stream, and returned vaporized bottoms liquid have an effect upon the thermal balance of the column, perhaps the most pronounced is the effect of the heat-input by way of the reboiler section. This particular source of enthalpy takes two forms: (I) the increased sensible heat of the liquid returned to the reboiler section and, (II) the latent heat of vaporization contained in the vapors generated in the reboiler heater. Since overall separation efficiency is largely dependent upon heat-input to the reboiler section and the flow rate of reflux to the rectification section, any thermal balance control system and method must take into account those loci within the fractionation column where the effects of varied reboiler section heat-input and reflux rates are most pronounced and immediate. The present invention directs itself to such a control system and method, and simultaneously considers the flow rate of the feed stream in order to maintain the required reflux/feed ratio.

The present invention is utilized to maintain the specified composition, or a composition characteristic of a product stream withdrawn from one end of a fractionation column, whether the desired product constitutes the overhead stream, the bottoms liquid, or both. Distillation techniques are extensively employed throughout the petroleum and petrochemical industries for the separation and recovery of select fractions of the feed stock, or of substantially pure compounds, and the adaptability thereto of the present control system and fractionation method will be recognized by those having the requisite skill in the appropriate art.

OBJECTS AND EMBODIMENTS

A principal object of my invention is to provide an efficient method for fractionating a feed stream having mixed components. A corollary objective is directed toward maintaining a fractionation column in thermal balance consistent with feed stream characteristics.

More specifically, it is an object of the present invention to afford a control system which enhances separation efficiency while simultaneously maintaining thermal balance.

Another object involves providing a control system which immediately counteracts the effect of changes in feed stream flow rate upon the reflux/feed volumetric ratio.

Briefly, these objects are attained by sensing four temperatures at selected points throughout the height of the fractionation column. The four tempertures are segregated into two specific pairs, each of which is employed in measuring a temperature differential (delta-T) between two points. The first pair of temperature sensors is vertically-spaced below the feed locus, or feed tray, at least one being proximate thereto. Although both may be proximate to the feed stream locus, it is preferred that the second temperature sensor be proximate to the locus through which the partially vaporized liquid bottoms material is returned to the reboiler section. A signal representative of the measured delta-T is generated. A second pair of temperature sensors is vertically-spaced above the feed tray. These may be disposed such that (i) both are proximate to the feed tray; (ii) one is proximate to the feed tray, while the second is proximate to the locus through which the reflux is returned to the rectification section; or, (iii) both are proximate to the reflux return locus. Where the liquid overhead product stream is recovered through a locus below that from which overhead vaporous material is withdrawn, it is preferred that the second pair of temperature sensors be below the locus of liquid overhead product recovery. A second signal representative of the measured delta-T is generated.

A computing device receives the two delta-T signals and generates a third signal representing a first computed relationship therebetween. This third signal is operated upon by a controlling means which generates a fourth signal. Flow measuring means generates a fifth signal representing the flow rate of the feed stream to the fractionation column. A second computing device receives the fourth and fifth signals and generates a sixth signal representing a second computed relationship. The quantity of reflux returned to the rectification section is regulated in response to this sixth signal. Heat balance of the fractionation column is controlled, and the reflux to feed ratio is maintained at the proper level consistent with separation efficiency and feed stream rate to the column.

One embodiment of my invention, therefore, directs itself to a control system for utilization in a fractionation column, wherein (i) a feed stream is introduced through a locus intermediate the top and bottom thereof; (ii) liquid bottoms material is recovered from the lower end of said column, and at least a portion thereof is partially vaporized and returned to the reboiler section; and, (ii) overhead material is recovered from the upper end of said column, condensed and at least a portion thereof returned to the rectification section as a reflux stream, the control system which comprises, in cooperative combination: (a) a first pair of vertically-spaced temperature sensors below said feed locus and a first differential-temperature measuring device communicating with said first pair of temperature sensors; (b) a second pair of vertically-spaced temperature sensors above said feed locus and a second differential-temperature measuring device communicating with said second pair of temperature sensors; (c) differential-temperature first computing means communicating with said first and second delta-T measuring devices; (d) first control means for generating a signal in response to a comparison of the value of the resulting computed differential with an adjustable preset value; (e) first measuring means for metering the rate of flow of said feed stream; and, (f) second computing means communicating with said first control means and said first measuring means, and co-acting with second control means for regulating the quantity of said reflux stream.

With respect to the techniques employed in recovering an overhead product stream from and introducing reflux to the rectification section of the fractionation column, my invention is intended to be adapted to columns configured as hereinbelow stated. First, a single vaporous overhead stream is recovered, at least partially condensed and introduced into a receiver from which a reflux portion is returned on flow control, the remainder being withdrawn as the net overhead product by way of liquid-level control within the receiver. Conversely, the net overhead product may be recovered on flow control, with the remainder being withdrawn as the reflux portion utilizing liquid level control within the receiver. Another technique involves withdrawing the net overhead product as a liquid from a tray below the reflux return locus, on flow control. The vaporous overhead stream is condensed, introduced into the receiver and refluxed in response to a liquid level control therein.

Another embodiment of my invention is specifically directed toward a method for controlling a fractionation column, wherein (i) a feed stream is introduced through a locus intermediate the top and bottom thereof; (ii) liquid bottoms material is recovered from the lower end of said column, and at least a portion thereof is partially vaporized and returned to the reboiler section; and, (iii) overhead material is recovered from the upper end of said column, condensed and at least a portion thereof returned to the rectification section as a reflux stream, which method comprises the steps of: (a) maintaining an inventory of liquid bottoms material in said reboiler section, sensing the level of said liquid inventory and regulating the quantity of net bottoms product leaving the column responsive to said level, while presetting the rate of heat-input to said reboiler section via said partially vaporized bottoms material; (b) sensing a first temperature differential between two vertically-spaced temperature-sensing points below said feed locus, measuring the resulting first delta-T and generating a first signal representative thereof; (c) sensing a second temperature differential between two vertically-spaced temperature-sensing points above said feed locus, measuring the resulting second delta-T and generating a second signal representative thereof; (d) obtaining a first computed relationship of said first and second signals and generating a third signal representative of the resulting first relationship; (e) generating a fourth signal responsive to a comparison of said third signal with a preset, adjustable value; (f) measuring the rate of flow of said feed stream and generating a fifth signal representative thereof; (g) obtaining a second computed relationship of said fourth and fifth signals, and generating a sixth signal representative of the resulting second relationship; and, (h) regulating the quantity of said returned reflux stream responsive to said sixth signal.

Other objects and embodiments, although not specifically delineated herein, will become evident from the following, more detailed description of my invention, and the control system and fractionation technique which it encompasses. In one such other embodiment, the first temperature differential is sensed between one temperature-sensing point proximate to said feed locus and a second temperature-sensing point proximate to the locus through which said partially vaporized bottoms material is returned to the reboiler section, and the second temperature differential is sensed between two temperature-sensing points, both of which are proximate to the locus through which said reflux stream is returned to the rectification section.

PRIOR ART

Temperature control at some point in a fractionation column, to maintain product composition at that point, in conjunction with the regulation of the enthalpy (heat-in-put) of a stream introduced into the column, must be acknowledged as old in the art of separation via distillation. Generally, either the flow rate of the reflux stream or the enthalpy of the partially vaporized liquid bottoms material is regulated. The enthalpy of the feed stream is seldom subject to direct control. Similarly, candor compels recognition of the fact that the published literature is replete with a myriad of techniques designed to afford some measure of control over some aspect of product separation in a fractionation zone. In view of the voluminous nature thereof, no attempt will be made herein to delineate exhaustively the appropriate prior art; a few typical illustrations will suffice. One prior art technique, now since improved upon, involves instituting an energy balance around the reboiler heater; a similar scheme computes the energy balance around the reboiler section of the column. While affording a measure of control, both techniques entail many measurements accompanied by a complex energy balance, and nonetheless are comparatively imprecise. Other techniques involve controlling the flow of fuel medium to the reboiler heater in response either to the temperature of the heated material returned to the reboiler section, or to the rate of mixed-phase flow. For the latter method, the quantity of liquid reboiler bottoms material introduced into the reboiler heater must be pre-set by way of flow control means.

Another prior art technique involves temperature measurement and control at the point from which the desired product stream is withdrawn, accompanied by regulation of either the heat-input at that point, or at some remote point. To illustrate, if the overhead product is specified as to some composition characteristic, the temperature at some proximate point is sensed and controlled either by regulating the heat-input to the reboiler section, or by adjusting the quantity of reflux to the rectification zone of the column.

Such basic techniques have since been improved upon as illustrated, for example, by the double differential-temperature control system found in U.S. Pat. No. 2,580,651, issued Jan. 1, 1952. Here, the overhead product composition is specified and the temperature gradient within the column is monitored around the feed locus. A first delta-T is measured by two vertically-spaced temperature sensors above the feed locus, both of which are proximate thereto. A second delta-T is measured through the use of two vertically spaced temperature sensors below the feed locus, again both of which are proximate thereto. Appropriate output signals are transmitted to computing (summing) means which develops an output signal representing the difference between the two delta-T's. This last output signal is employed to adjust the heat-in-put to the reboiler section. Also disclosed is the fact that the reboiler section heat-input could be pre-set and the signal from the summing means utilized to control the quantity of reflux to the rectification zone of the column. It is noteworthy that output signals representing the double delta-T's are not used in conjunction with an output signal representative of the flow rate of the feed stream to control the reflux rate and maintain the reflux/feed volumetric ratio.

In U.S. Pat. No. 2,684,326, issued July 20, 1954, a similar technique is disclosed, wherein two delta-T's are measured, one above and one below the feed locus. Again, all four temperature sensors are located proximate to the feed locus and are used to control the heat distribution at both ends of the column. In one embodiment, the double differential-temperature signal controls the reflux rate, while a single differential-temperature signal (from below the feed locus) controls the reboiler section heat-input. Alternatively, a single differential-temperature signal (from above the feed locus) regulates and reflux rate, whereas the double differential-temperature signal adjusts the heat-input to the reboiler section. There is no indication, as above stated, of using differential measurements in combination with the feed stream flow rate to the column.

More recently, U.S. Pat. No. 3,464,895 issued Sept. 2, 1969, describes a differential-temperature control technique founded upon sensing six temperatures within the fractionation column. The specified product is an overhead stream, and one pair of vertically-spaced temperature sensors measures the differential temperature within the rectification zone, between two points, one of which is immediately below the locus through which the reflux is returned, and the second of which is about five trays below the reflux locus. The signal representing the resulting temperature differential is utilized to adjust the quantity of reflux returned to the column from the overhead receiver. All of the remaining four temperature sensors are situated below the feed tray, and are ultimately used to provide an output signal which regulates the heat-input to the reboiler section. In accordance with the disclosed technique, the feed locus is immediately above tray 24 (out of 48 which are disposed in the column), and one pair of sensors is located at trays 25 and 28, providing a first delta-T; the second pair of temperature sensors are situated at trays 25 and 40, and provide a second delta-T which, in effect, brackets the first delta-T. The appropriate signals are transmitted to a computing relay which develops a signal representative of the quotient of the first delta-T divided by the second delta-T. This signal is utilized to adjust the heat-input to the reboiler section of the column. It should be noted that no temperature, either below or at the feed locus is considered in regulating the reflux rate. Furthermore, changes in the flow rate of the feed stream to the column are not considered directly in regulation of the reflux rate.

Shortcomings of the prior art fractionation control systems, exemplified by U.S. Pat. No. 2,580,651, 2,684,326 and 3,464,795, are clearly overcome through the utilization of the present invention, wherein the effect of feed stream heat-input contribution, resulting from a varying flow rate, is considered in regulating the reflux rate. None of these illustrated prior art schemes recognize the advantage of directly adjusting the reflux rate to maintain the reflux/feed ratio necessary in high-efficiency fractionation techniques. In accordance with the present invention, the flow rate of the feed is monitored, a signal representative thereof is generated and immediately considered in regulating the reflux rate, either directly, or indirectly by regulating the rate at which the net overhead product stream is withdrawn.

SUMMARY OF INVENTION

The principle that the temperature of a boiling mixture at a constant pressure is a direct function of its composition underlies control systems intended for use in conjunction with fractionation facilities. In basic form, a temperature at a selected point in the distillation column is controlled to maintain constant composition of the material at that point. Generally, the selected temperature control point is located above the feed tray if it is desired to maintain the overhead product composition, and below the feed tray if the specified composition characteristic is directed toward the bottoms product. In certain circumstances, however, the selected locus of the temperature control point inherently gives rise to a tradeoff between the sensitivity of control and response time of the system. For enhancement of control sensitivity, the temperature control point should be such that a relatively minor variation in product composition corresponds to a comparatively large temperature change at the control point. Conversely, to minimize the system's response time (lag time), the temperature control point should be close to the locus of immediate effect of the variable which is to be regulated. For example, if the reflux flow rate is to be adjusted by the temperature controller, it is preferably to locate the temperature sensing point in the upper section of the column, whereas, if the heat-input to the reboiler section is the regulated variable, the temperature sensing point should be a locus in the lower section of the column.

Certainly, the prior art differential-temperature control systems, hereinbefore set forth, have done much to improve upon the basic technique outlined above, and have improved separation efficiency while improving the relationship between response time and control sensitivity. The control system and method of the present invention offers additional improvement with respect to sensitivity of control and response time, and further improves upon efficiency of separation. This results not only from the preferred locations selected for the various temperature-sensing points, but also from considering the feed steam flow rate in conjunction with a double differential-temperature gradient to control or regulate the reflux rate. The fractionation column is, therefore, maintained under the proper reflux to feed volumetric ratio, and the flow rate of the feed stream is directly considered in regulating and controlling the thermal balance of the column.

As hereinbefore stated, there are two major factors in the heat balance of a frationation column. These are the overhead reflux and the partially vaporized liquid bottoms material returned to the reboiler section of the column. Of these, the major heat source is the partially vaporized bottoms material, generally considered to be the driving force behind the distillation operation. As in many prior art control techniques, the direct regulation, or adjustment of the heat-input to the reboiler section via the present system is not essential. In accordance with the present method of maintaining a fractionation column in the thermal balance, the heat-input, or enthalpy of this stream is independently established, or pre-set by way of a flow control device adjusting the rate of the heat-medium utilized to partially vaporize the bottoms return stream, with bottoms produce recovery being governed by the level of liquid in the reboiler section.

The control system and method encompassed by the present inventive concept involves sensing four temperatures throughout the column, two of which are below the feed tray, and two of which are above the feed tray. Each pair of sensors is vertically-spaced; that is, separated by one or more trays within the column. With respect to the sensors below the feed locus, a least one is proximate thereto, while the second is proximate to the locus through which the partially vaporized bottoms liquid is returned to the reboiler section. The latter does not sense a temperature within the reboiler section, but rather one which is above the lowermost tray. The resulting differential temperature, from which a signal is generated, represents the temperature gradient throughout virtually the entire stripping section, and thus immediately reacts to enthalpy changes of the feed stream and the heat-input to the reboiler section. The second pair of temperature sensors, above the feed tray, is preferably disposed proximate to the locus through which the liquid reflux is returned to the rectification section of the column. Where the liquid overhead product is recovered separately from the overhead vaporous stream, and from a locus below that through which the reflux is returned, the second pair of vertically-spaced sensors is below and proximate to the locus of liquid overhead withdrawal. The resulting temperature differential, from which a signal is generated, represents a temperature gradient proximate to the point of overhead product withdrawal, and reacts immediately to changes effected by variations in the reflux rate.

The signals representing the two temperature gradients, or two delta-T's, are introduced into computing means which develops another signal representing a computed relationship thereof – preferably, the computed relationship is indicative of the difference between the two delta-T's. This latter computed signal is operated upon by a controller, producing a resultant signal which, along with a signal representative of the flow rate of the feed stream is transmitted to another computing means (a Feed Forward Modulator). Another signal is generated thereby and utilized in regulating the quantity of overhead material which is returned to the rectification section as the reflux stream.

As stated, in the above synopsis, my invention is readily adaptable for intergration with three of the more common techniques for conducting fractionation-type separation. Two of these involve initially withdrawing a single overhead vaporous stream which is condensed and introduced into an overhead receiver. In one technique, the reflux therefrom is on some form of flow control, while the overhead product stream is recovered responsive to changes in the liquid level within the receiver. The second technique is the reverse; that is, the rate of net product withdrawal is on flow control while variations in the receiver level affect the rate at which reflux is returned. In the third system, the overhead product stream is withdrawn as a liquid from a tray below the reflux locus, the quantity thereof regulated in accordance with some form of flow control. Overhead vapors are separately recovered, obviously through a locus above the reflux, condensed, introduced into the overhead receiver and returned as a reflux in response to the level of liquid in the receiver. In all three techniques, the quantity of reflux is regulated, either directly, or indirectly when the product withdrawal rate is regulated directly.

BRIEF DESCRIPTION OF THE DRAWINGS

In further describing the present control system and its method of operation, reference will be made to the accompanying drawings. It is understood that these are presented solely for illustration purposes, and are not intended to be construed as limiting upon the scope and spirit of my invention as defined by the appended claims. Miscellaneous appurtenances, not required for a clear understanding of the inventive concept, have been eliminated or reduced in number, Such items are well within the purview of one having the requisite skill in the art.

In all three illustrations, the preferred selected locations for temperature sensors 33, 35, 38 and 40 are shown. It should be noted with respect to FIG. 3, that sensors 33 and 35 are below and proximate to the locus of liquid product withdrawal via line 60.

DETAILED DESCRIPTION OF DRAWINGS

Figure 1:
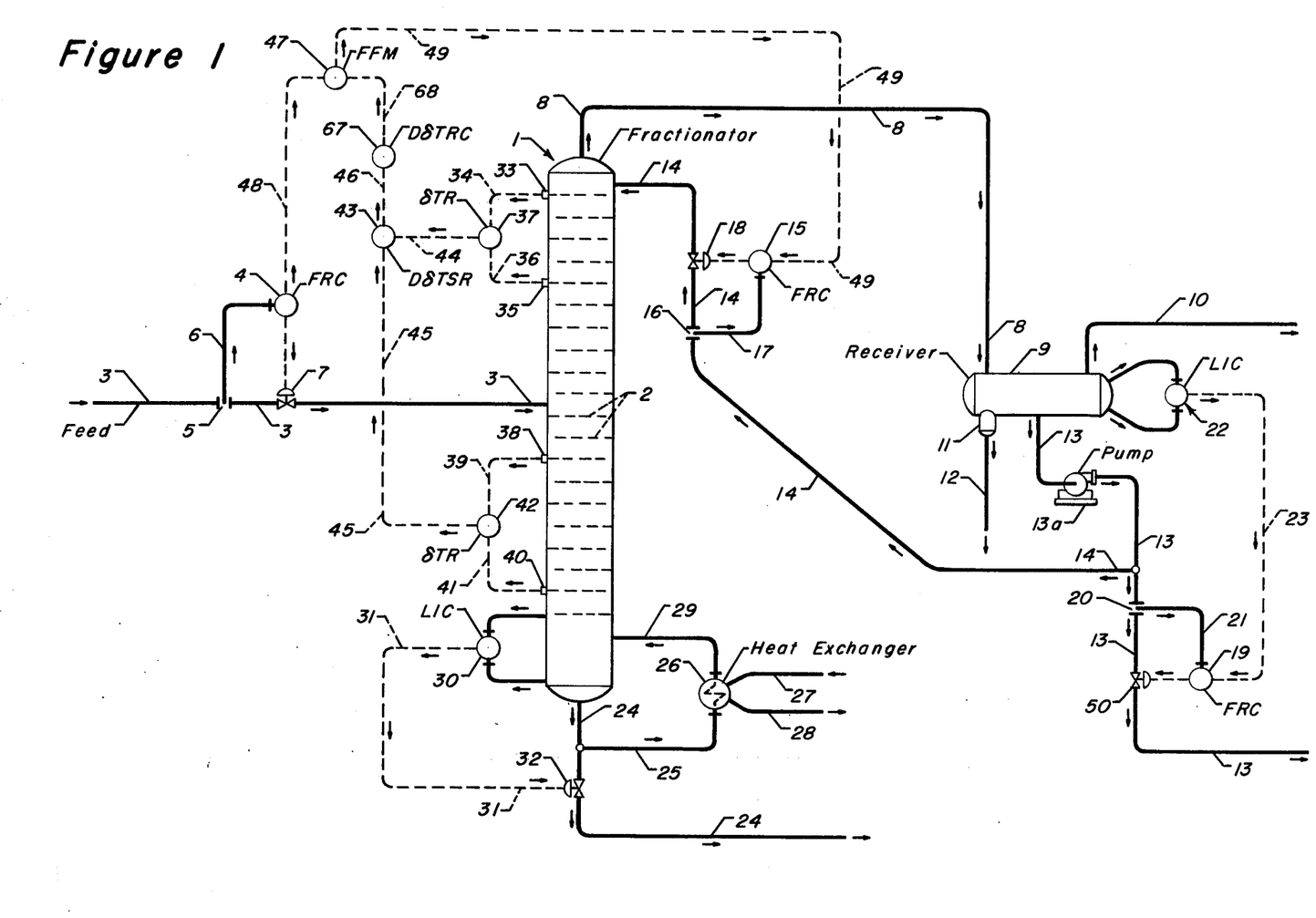
FIG. 1 shows a fractionating column 1 having a plurality of spaced-apart trays, or decks 2, a feed stream conduit 3, an overhead vaporous product conduit 8, a reflux return conduit 14, and a bottoms product conduit 24. In the illustrated embodiment, the reflux rate is regulated by the control signal in line 49, while liquid product recovery through line 13 is responsive to a signal from Level Indicator Controller (LIC) 22.

With specific reference now to FIG. 1, fractionation column 1 is shown as having a plurality of spaced-apart trays, or decks 2, the precise design and configuration of which is not an essential feature of the present invention. The feed stream is introduced, via line 3, through an intermediate locus. Flow Recorder Controller (FRC) 4, having an adjustable setpoint, regulates the flow rate as measured by metering means (an orifice plate) 5 and conduit 6 and adjusts the opening of control valve 7 accordingly.

A single vaporous phase overhead stream is withdrawn through conduit 8, at least partially condensed (via means not illustrated) and introduced into overhead product receiver 9. Any non-condensible material is vented through conduit 10, while any water settles into drop-leg 11, to be removed periodically via conduit 12. Condensed overhead material is withdrawn by way of line 13 into the suction side of pump 13a, and a portion thereof is diverted through line 14 as the returned reflux stream. The quantity of reflux is regulated by FRC 15, in response to the flow rate metered by orifice plate 16 and conduit 17; an appropriate signal, representing the variance between the measured flow rate and that required by the control point, is transmitted to control valve 18, the opening of which is adjusted in response thereto. The remainder of the condensed overhead material continues through line 13, the quantity of which is monitored by FRX 19, and is recovered as the desired overhead product. Regulation of the product recovery is accomplished by metering the flow rate through orifice meter 20 and line 21; a comparison is made with the control point setting, and control valve 50 adjusted in response to the signal from FRC 19.

Liquid bottoms material is withdrawn from the reboiler section through conduit 24, a portion thereof being diverted through line 25 and introduced thereby into heat-exchanger 26. Partial vaporization is effected through the use of a suitable heat exchange medium which may be steam, hot oil, etc., being introduced via line 27, and exiting through line 28. The resulting partially vaporized liquid bottoms is returned to the reboiler section by way of conduit 29. The rate of net bottoms product removal in line 24 is adjusted in response to the liquid level in the reboiler section as sensed by Level Indicating Controller 30; a signal is generated and transmitted, via instrument line 31, to control valve 32 which is responsively adjusted.

The immediate effect of the reflux return through line 14 is sensed by vertically-spaced temperature sensors 33 and 35, both of which are proximate to the reflux return locus. Signals are transmitted, via instrument lines 34 and 36, respectively, to Differential Temperature Recorder ($dTR$) 37 which develops a signal representative of the sensed temperature difference (delta-T). Vertically-spaced temperature sensors 38 and 40 are both disposed below the feed locus, one 38 being proximate thereto, while the second 40 is proximate to the locus through which the partially vaporized liquid bottoms is returned to the reboiler section. Signals are transmitted via instrument lines 39 and 41, respectively, to dTR 42 which generates a signal representing the sensed temperature difference (delta-T), or the temperature gradient throughout virtually the entire stripping section.

The delta-T signals from dTR 37 and dTR 42 are transmitted via instrument lines 44 and 45 to Double delta-T Summing Relay (summing means) 43 which develops a signal representing the delta-T difference. This signal is, in turn, transmitted via line 46 to DdTRC 67 which compares the measured delta-T difference with a setpoint value, producing a signal which is sent via line 68 to Feed Forward Modulator 47 which also receives a signal, via line 48, from FRC 4 representative of the flow rate of the feed stream in line 3. FFM 47 is, in effect, a computing means which modulates the reflux-to-feed ratio in response to both the feed rate and the composition profile as sensed by the double delta-T control signal in line 68, and generates another signal. This is transmitted, via instrument line 49, to the adjustable setpoint of FRC 15 which adjusts the opening of control valve 18 in response thereto, thus regulating the rate of reflux return to the rectification section of the column. As the rate of reflux is varied, the level of liquid in receiver 9 fluctuates. This is sensed by LIC 22 which transmits and appropriate signal, via line 23, to FRC 19 which adjusts the opening of control valve 50, thus regulating the rate of product withdrawal through conduit 13.

Figure 2:
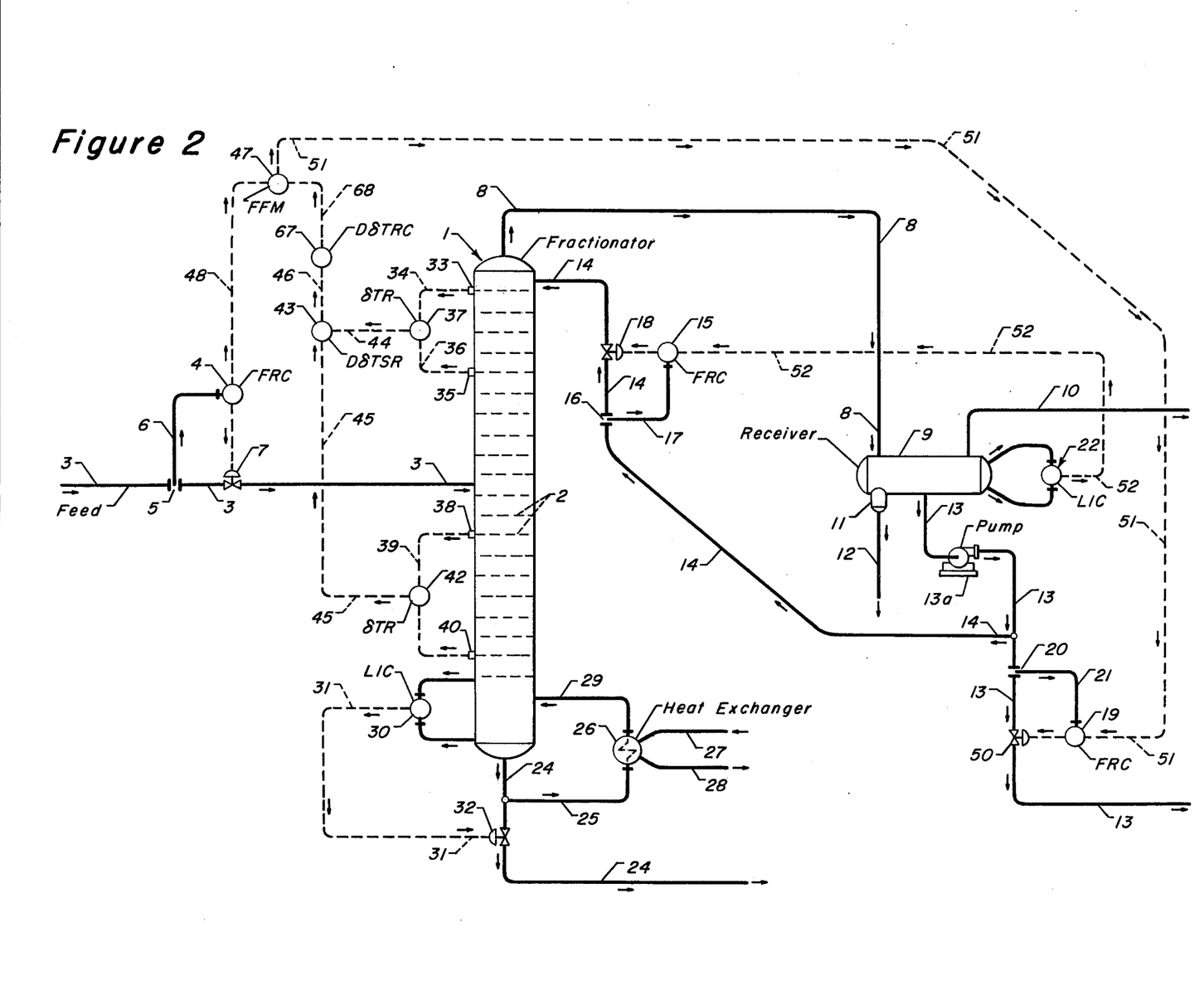
FIG. 2 presents another embodiment wherein the control signal in line 51 regulates the quantity of overhead product recovered via conduit 13, while the reflux rate through line 14 is responsive to the signal from LIC 22.

In the embodiment presented in FIG. 2, the signal developed by FEM 47 is transmitted, via line 51, to FRC 19. The latter adjusts the opening of control valve 50 to regulate the quantity of product recovered through conduit 13. The varying flow rate through line 13 will produce fluctuations in the liquid level in overhead receiver 9. LIC 22 senses the level changes and transmits an appropriate signal, via instrument line 52, to FRC 15 which effects an adjustment in the opening of control valve 18 in order to regulate the rate of reflux return via conduit 14.

Figure 3:
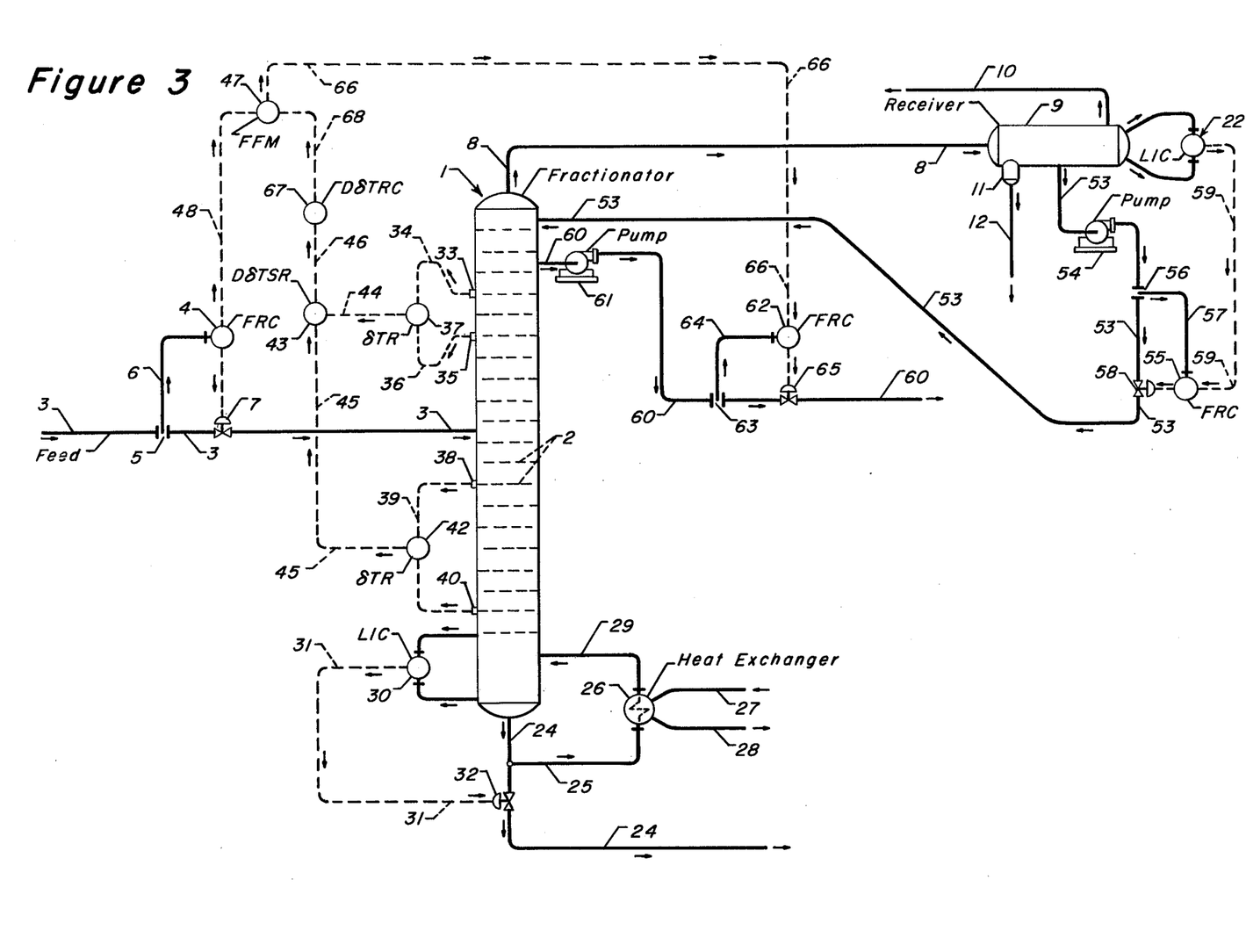
FIG. 3 is illustrative of the fractionation technique wherein the intended net overhead produce is withdrawn through conduit 60, below reflux return conduit 53. The control signal in line 66 adjusts the quantity of net product recovered, which produces fluctuations of the liquid level in receiver 9. These are sensed by LIC 22, the signal from which in line 59, regulates the external reflux return through line 53. The internal reflux below conduit 60 product withdrawal point is directly altered when the quantity of product withdrawn is adjusted.

FIG. 3 illustrates the adaptability of the present control system to the technique where the overhead product stream is recovered from tray below the reflux locus, as a side-cut liquid in conduit 60. In this situation, it should be noted that temperature sensors 33 and 35 are disposed below the locus through which the product is recovered. The product is recovered through the use of pump 61, and the flow rate is controlled by FRC 62, which receives the flow rate indication from orifice meter 63 and conduit 64, and adjusts the opening of control valve 65 accordingly. The signal from FFM 47 is transmitted through instrument line 66 to FRC 62, and valve 65 is adjusted in response thereto. Overhead vaporous material is withdrawn via line 8, condensed and introduced into overhead receiver 9. Reflux is returned to the rectification section through conduit 53 and pump 54, the rate thereof being controlled by FRC 55 which monitors the flow through the use of orifice meter 56 and conduit 57, and adjusts the opening of control valve 58 accordingly. LIC 22 transmits a signal, representative of the liquid level in receiver 9, through instrument line 59 to FRC 55 which, as above set forth, effects an appropriate adjustment in control valve 58 such that the reflux flow rate is regulated.

The foregoing illustrates the present control system and the several applications thereof in controlling the heat balance of a fractionation column. The benefits attained by considering the feed stream flow rate in regulating the reflux to the rectification section will be immediately recognized by those possessing the requisite skill in the art.

I claim as my invention:

1. In a fractionation column wherein (i) a feed stream is introduced through a locus intermediate the top and bottom thereof; (ii) liquid bottoms material is recovered from the lower end of said column, and at least a portion thereof is partially vaporized and returned to the reboiler section; and, (iii) overhead material is recovered from the upper end of said column, condensed and at least a portion thereof returned to the rectification section as a reflux stream, the control system which comprises, in cooperative combination:
   a. a first pair of vertically-spaced temperature sensors below said feed locus one of which is proximate thereto and the second of which is proximate to the locus through which said partially vaporized liquid bottoms material is returned to said reboiler section and a first differential-temperature measuring device communicating with said first pair of temperature sensors;
   b. a second pair of vertically-spaced temperature sensors above said feed locus both of which are proximate to the locus of liquid overhead withdrawal and a second differential-temperature measuring device communicating with said second pair of temperature sensors;
   c. differential-temperature first computing means communicating with said first and second delta-T measuring devices;
   d. first control means for generating a signal in response to a comparison of the value of the resulting computed differential with an ajustable pre-set value;
   e. first measuring means for metering the rate of flow of said feed stream; and
   f. second computing means communicating with said first control means and said first measuring means, and co-acting with second control means for regulating the quantity of said reflux stream.

2. The control system of claim 1 further characterized in that said second control means directly regulates the quantity of reflux returned to said rectification section and third control means responds to the liquid level of said condensed overhead material and regulates the quantity of said overhead material recovered as a product stream.

3. The control system of claim 1 further characterized in that said second control means directly regulates the quantity of said overhead material recovered as a product stream and third control means responds to the liquid level of said condensed overhead material and regulates the quantity of reflux returned to said rectification section.

4. The control system of claim 1 further characterized in that said second control means directly regulates the quantity of overhead material recovered from said column as a first overhead liquid product stream, and third control means responds to the quantity of vaporous material exiting as a second overhead stream, and regulates the rate of said reflux stream in response to the quantity of said vaporous material.

5. A method for controlling a fractionation column, wherein (i) a feed stream is introduced through a locus intermediate the top and bottom thereof; (ii) liquid bottoms material is recovered from the lower end of said column, and at least a portion thereof is partially vaporized and returned to the reboiler section; and, (iii) overhead material is recovered from the upper end of said column, condensed and at least a portion thereof returned to the rectification section as a reflux stream, which method comprises the steps of:
   a. maintaining an inventory of liquid bottoms material in said reboiler section, sensing the level of said liquid inventory and regulating the quantity of net bottoms product leaving the column responsive to said level, while presetting the rate of heat-input to said reboiler section via said partially vaporized bottoms material;
   b. sensing a first temperature differential between two vertically-space temperature-sensing points below said feed locus one of which is procimate thereto and the second of which is proximate to the locus through which said partially vaporized liquid bottoms material is returned to said reboiler section, measuring the resulting first delta-T and generating a first signal representative thereof;
   c. sensing a second temperature differential between two vertically-spaced temperaure-sensing points above said feed locus both of which are proximate to the locus of overhead withdrawal, measuring the resulting second delta-T and generating a second signal representative thereof;
   d. obtaining a first computed relationship of said first and second signals and generating a third signal representative of the resulting first relationship;
   e. generating a fourth signal responsive to a comparison of said third signal with a pre-set, adjustable value;
   f. measuring the rate of flow of said feed stream and generating a fifth signal representative thereof;
   g. obtaining a second computed relationship of said fourth and fifth signals, and generating a sixth signal representative of the resulting second relationship; and,
   h. regulating the quantity of said returned reflux stream responsive to said sixth signal.

6. A method for controlling a fractionation column, wherein (i) a feed stream is introduced through a locus intermediate the top and bottom thereof; (ii) a liquid bottoms material is recovered from the lower end, and at least a portion thereof is partially vaporized and returned to said reboiler section; (iii) an overhead vaporous stream is withdrawn from the upper end, condensed and at least a portion thereof returned to the rectification section as a reflux stream; and, (iv) an overhead liquid product stream is recovered through a locus below that through which said relux stream is returned, which method comprises the steps of:

a. maintaining a inventory of liquid bottoms material in said reboiler section, sensing the level of said liquid inventory and regulating the quantity of net bottoms product leaving the column responsive to said level, while presetting the rate of heat-input to said reboiler section via said partially vaporized bottoms material;

b. sensing a first temperature differential between two vertically-spaced temperature-sensing points below said feed locus, one of which is proximate thereto and the second of which is proximate to the locus through which said partially vaporized bottoms material is returned to said reboiler section, measuring the resulting first delta-T and generating a first signal representative thereof;

c. sensing a second temperature differential between two vertically-spaced temperature-sensing points above said feed locus, both of which are proximate to the locus through which said liquid product is recovered, measuring the resulting second delta-T and generating a second signal representative thereof;

d. obtaining a first computed relationship of said first and second signals and generating a third signal representative of the resulting first relationship;

e. generating a fourth signal responsive to a comparison of said third signal wth a pre-set, adjustable value;

f. measuring the rate of flow of said feed stream and generating a fifth signal representative thereof;

g. obtaining a second computed relationship of said fourth and fifth signals, generating a sixth signal representative of the resulting second relationship and regulating the quantity of said liquid overhead stream recovered as an overhead product stream in response to said sixth signal; and, h. regulating the rate of flow of said reflux stream responsive to the rate of flow of said overhead vapor stream.

* * * * *